F. M. BEYDLER.
PLOW.
APPLICATION FILED DEC. 17, 1909.
978,815.
Patented Dec. 13, 1910.
2 SHEETS—SHEET 2.
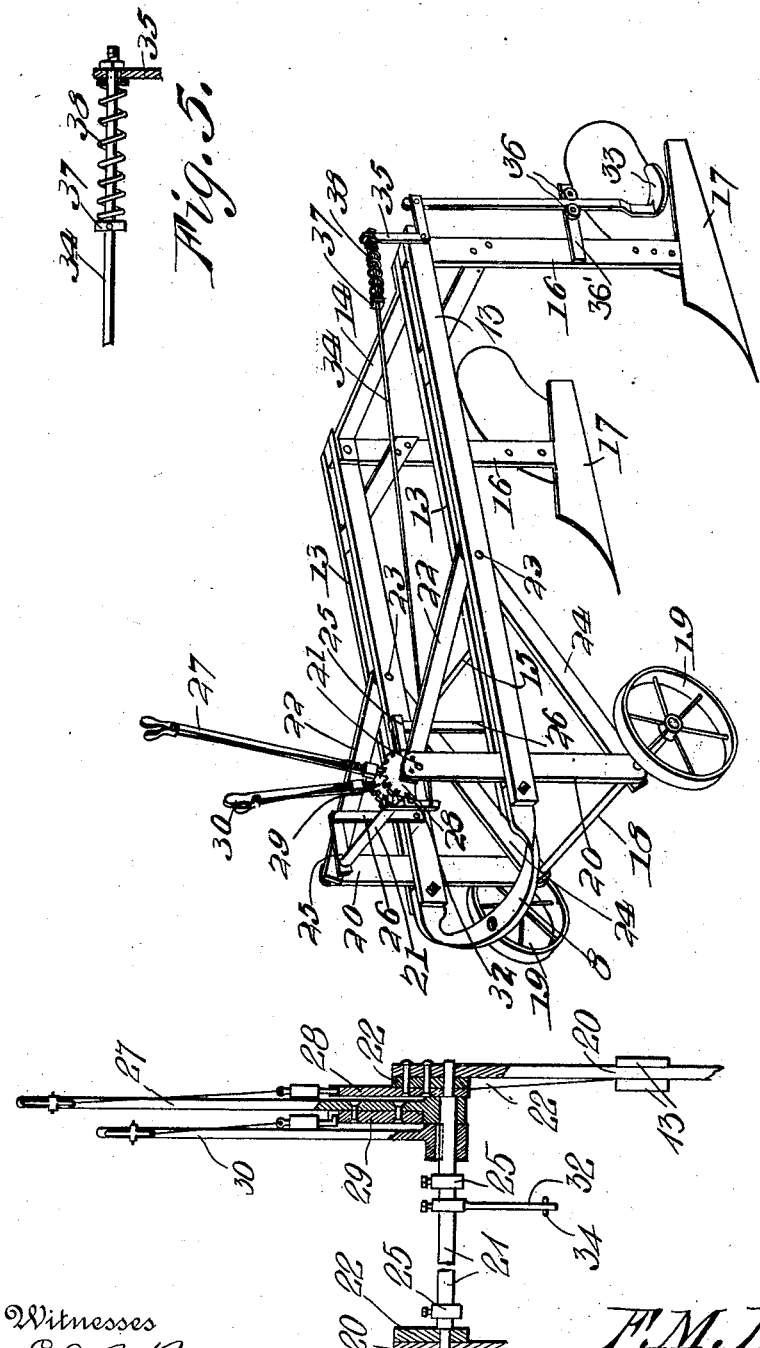

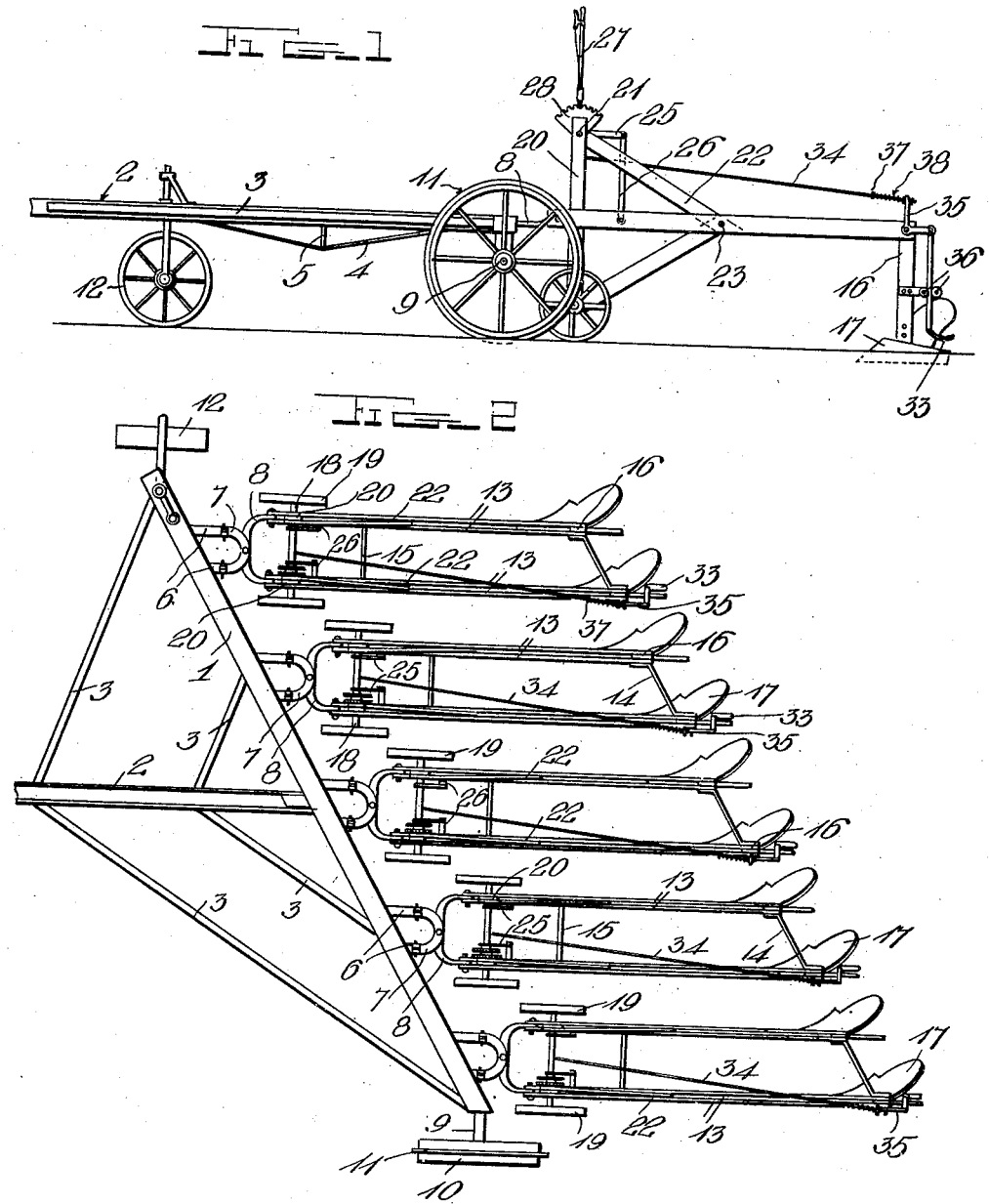

UNITED STATES PATENT OFFICE.

FRANK M. BEYDLER, OF ASHLAND, KANSAS.

PLOW.

978,815.

Specification of Letters Patent.  Patented Dec. 13, 1910.

Application filed December 17, 1909. Serial No. 533,566.

*To all whom it may concern:*

Be it known that I, FRANK M. BEYDLER, a citizen of the United States, residing at Ashland, in the county of Clark and State of Kansas, have invented certain new and useful Improvements in Plows; and I do declare the following to be a full, clear, and exact description of the invention, such as will enable others skilled in the art to which it appertains to make and use the same.

My invention relates to plows and particularly to that type of plows known as gang plows.

The object of the invention is to provide a plow of this class which is adapted to be drawn by a traction engine or other high power device and which will have the plow gangs in separate pairs adapted to move individually whereby any inequalities in the ground are compensated for and the points kept at an even distance in the ground.

A further object of the invention is the provision of novel means for connecting the individual gangs to the draft beam and a further object is the provision of means for raising and lowering the plows from the ground so that the machine may readily travel from one field to the other.

With these and other objects in view, the invention consists of certain novel features of construction, combination and arrangements of parts as will be more fully described and particularly pointed out in the appended claims.

In the drawings, Figure 1 is a side elevation; Fig. 2 is a top plan view; Fig. 3 is a perspective view on an enlarged scale of one of the gangs removed from the draft beam; and Fig. 4 is an enlarged detail transverse sectional view. Fig. 5 is an enlarged detail of the spring-carrying end of the connecting link with the bell crank shown in section.

Referring more especially to the drawings, 1 represents a draft beam which has centrally secured thereto a draft pole or bar 2, which is braced to the beam by diagonals 3. This beam is constructed of heavy steel and is braced horizontally by a strain wire or rod 4 which is connected to the underside of the beam at each end and is held apart therefrom by spacing struts 5. Extending rearwardly from the beam, in parallelism with the draft pole 2, are separated arms 6, to which are hingedly connected for vertical pivoting the clevises 7. These clevises constitute horizontally parallel halves between which is pivoted the draft hook or yoke 8, for each separate gang frame. It will thus be seen that the individual gang frames have free movement vertically as well as horizontally with respect to the draft beam 1. The platform (not shown) for the operation of said gangs is arranged on the main frame at any suitable point.

Extending from one end of the draft beam is a short stub axle 9, upon which is journaled a traction wheel 10, in this instance provided with a central thrust flange 11, which is adapted to bite the ground and prevent any lateral skidding of the plow when the gangs are partially or fully raised. The opposite end of the beam 1, is supported upon a caster wheel 12, which is swiveled to the beam to have free swinging movement.

As each gang frame is similar in all respects and as they are individually connected to the beam in numbers to suit, one only of the frames will be described specifically.

Secured to the ends of the yoke 8, are plow beams 13, each comprising a pair of parallel members separated in any suitable manner and extending rearwardly from the yoke member. At their rear ends, the separate beams are braced apart and held in parallelism by a bar 14 and their forward ends are braced apart by a cross-bar 15. At the rear ends of the beams, there are secured the depending plow standards 16, to which the plows 17 are secured as is usual.

Extending upwardly from a suitable supporting axle 18, upon which is journaled the supporting wheels 19, are standards 20. These standards project between the parallel members of the beams 13 and are braced apart at their upper ends by a crank shaft 21, to which are connected the upper ends of diagonal braces 22, leading therefrom to pivotal bolts 23, carried by the beams 13. These diagonal braces 22 have their upper ends inside of the standards 20 and their lower ends arranged between the parallel members of the beams 13. Similar braces 24 are pivotally secured to the axle 18 and connected to the bolts 23. This effectually supports the beams 13 and renders their forward extremities substantially independent of the standards 20, because their forward extremities as will hereinafter be described, have movement upon the standards to raise the plows from or lower them into the ground.

Keyed to the shaft 21 and normally extending laterally and rearwardly therefrom at each end are cranks 25 which are about seven and one-half inches long more or less, and to which the beams 13 are connected near their front ends by links 26. These links 26 are operated by two levers 27 and 30, the lever 27 being mounted to turn on the shaft 21 and having a pawl operating over a segmental rack 28 fixed on one of the standards 20 and the lever 30 being keyed to the shaft 21 and having a pawl operating over a segmental rack 29 rigidly secured to the lever 27 for the purpose of holding the lever 30 connected with the lever 27. This lever 30 is keyed to the shaft 21 and in addition to operating the plow beams also operates the crank 32 fixed on the shaft 21 for raising or lowering the supporting shoe 33 through a connecting link 34 and a bell crank lever 35. This shoe 33 has an upwardly extending shaft connected to the bell crank lever 35 and which travels between friction rollers 36 preferably mounted on a bracket 36' extending laterally from one of the plow standards 16. The rod 34 is provided with a collar 37 located some distance from the upper end of the bell crank lever 35 and adapted to form a step for one end of a spiral spring 38, so that inaccuracies in the ground encountered by the shoe will not be transmitted to the crank 32, or the lever 30.

It will be obvious that the segment 29 with which the pawl of lever 30 is engaged, being fixed to the lever 27 which is loose on the shaft 21, and the pawl of said loose lever 27 operating over the segmental rack 28 which is fixed on the standard 20, the movement of the lever 27 back and forth successively moves the segment 29 with it and through the pawl or lever 30 also moves said lever 30 simultaneously with lever 27 and through the shaft 21 to which lever 30 is fixed raises and lowers the plow according to the direction of the movement of the levers. For example: It will be assumed that both the levers 27 and 30 are extended forwardly with the cranks 25 extending upwardly into substantially vertical position, the plows being thus held above the surface of the ground in inoperative position. The movement of lever 30 into vertical position when the pawl thereof is released from rack 29 will cause the cranks 25 to move rearwardly and downwardly whereby the plows 17 will be lowered about one-half the distance of which they are capable of moving and this movement will project them into the ground about one and one-half inches, as shown in Fig. 1. The pawl of lever 30 is then caused to engage rack 29 and the lever 27 moved to upright position which carries with it lever 30 and throws it into its extreme rearward position which movement of lever 30 turns the shaft 21 sufficiently to cause the cranks 25 to move downwardly into vertical position which forces the plows into the ground about nine inches more or less, leaving the lever 27 in upright position within easy reach of the operator for controlling the plows to a limited extent and for bringing the lever 30 forward when desired into easy reach of the operator.

It will thus be seen that in actual operation the depth of the plows may be ordinarily regulated by the lever 27 after lever 30 has been adjusted in operating position and the plows may be raised and lowered for turning and the like by operation of the lever 27, but for the extreme movements of said plow the lever 30 is operated. By the use of these two levers the adjustment of the plows is accomplished partly by one and partly by the other. One of them is always in reach of the operator and neither is ever brought low enough to come in contact with the platform or main frame.

It will be noticed that by constructing a gang plow in this manner, each separate gang or pair of plows is individually connected to the draft beam so that they may be individually raised or lowered and each may accommodate itself to the conditions.

From the foregoing description, taken in connection with the accompanying drawings, the construction and operation of the invention will be readily understood without requiring a more extended explanation.

Various changes in the form, proportion and the minor details of construction may be resorted to without departing from the principle or sacrificing any of the advantages of the invention, as defined in the appended claims.

Having thus described my invention, what I claim is:

1. A plow comprising a draft beam, a gang frame pivotally connected thereto for vertical and horizontal movement and comprising an axle, a pair of supporting wheels mounted thereon, standards projecting upwardly from said axle, bracing mechanism secured to the standards, plow beams fulcrumed intermediately of their ends upon said bracing means, plows upon the beams, adjustable means for supporting the plows in elevated position and means for raising and lowering the beams at one end.

2. A plow comprising a draft beam, gang frames pivotally connected thereto and composed of a pair of supporting wheels, standards extending therefrom, bracing devices connected to the standards, parallel plow beams fulcrumed upon the bracing devices, means carried by the standards for raising and lowering the forward ends of the beams, means for flexibly supporting the plow beams in raised position, a segmental rack carried by the beam adjusting means, and a lever for adjusting said supporting mechanism which engages said rack.

3. A plow comprising a draft beam, a gang frame pivotally connected thereto and composed of supporting wheels, standards extending upwardly therefrom, braces connected at one end to opposite ends of said standards and pivotally connected together at their other ends, plow beams fulcrumed intermediately of their ends to the pivots which connect said braces and each composed of two parallel bars, said braces being arranged between the members of said beams, the front end of said beams being slidably engaged with said standards, plows depending from the rear ends of said beams, means for supporting said beams in raised position, and means for holding said supporting means in adjusted position.

In testimony whereof I have hereunto set my hand in presence of two subscribing witnesses.

FRANK M. BEYDLER.

Witnesses:
EARLE G. WALLINGFORD,
SIDNEY GRIMES.